Oct. 5, 1965
R. O. PARKER
3,210,766
SLOT TYPE ANTENNA WITH TUNING CIRCUIT
Filed Feb. 15, 1962
2 Sheets-Sheet 1
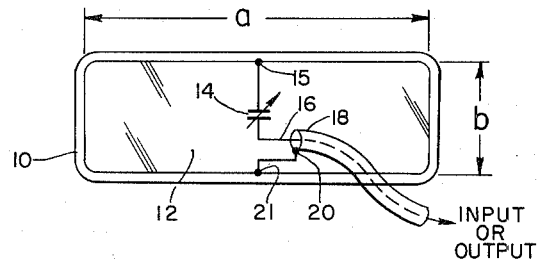
FIG. 1.
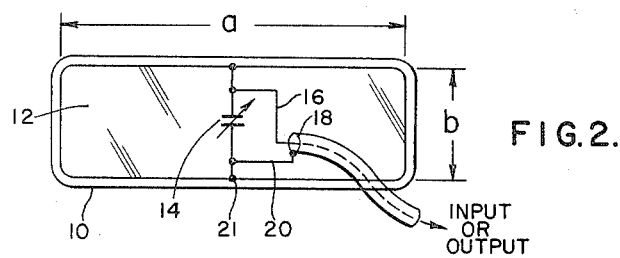
FIG. 2.
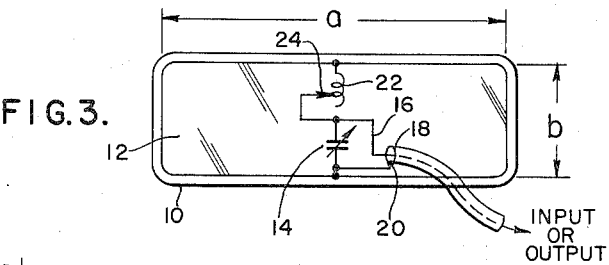
FIG. 3.
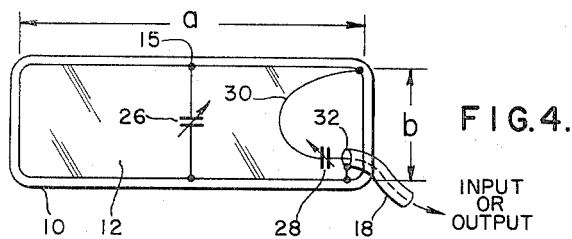
FIG. 4.
FIG. 5.
$l_1 = \dfrac{\lambda}{2}$ @ fused
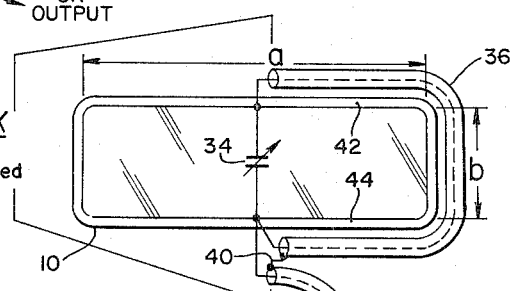
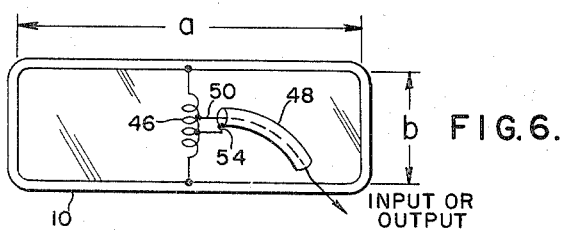
FIG. 6.
INVENTOR.
RALPH O. PARKER
BY *Lyon & Lyon*
ATTORNEYS.

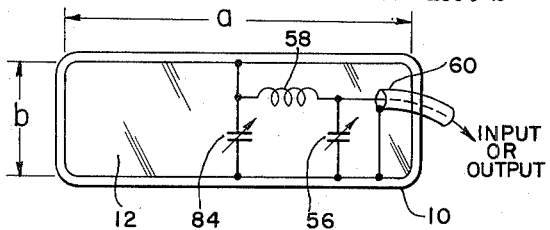
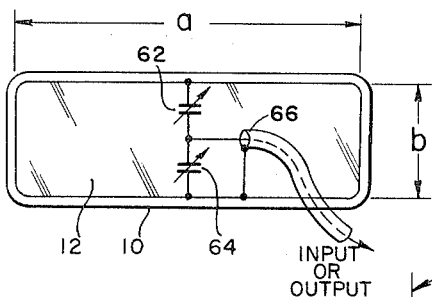
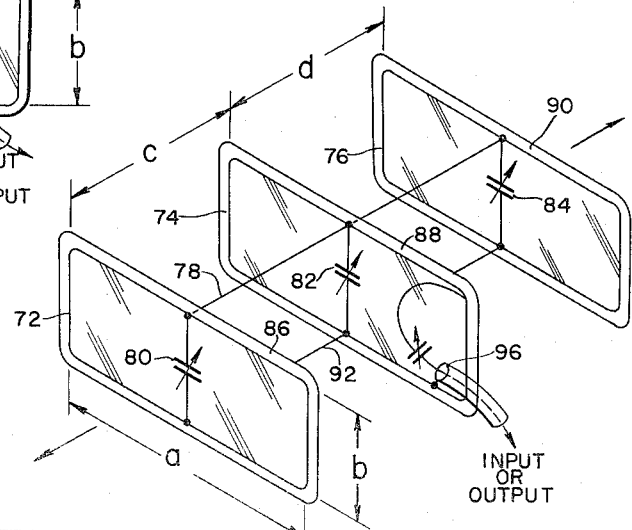
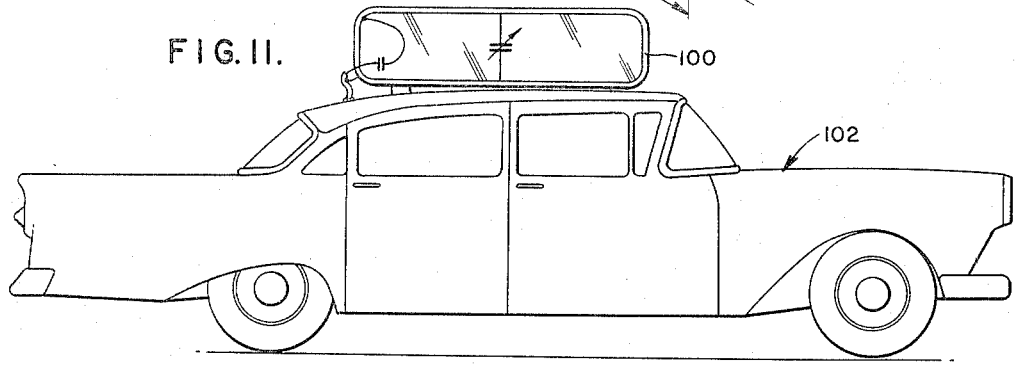
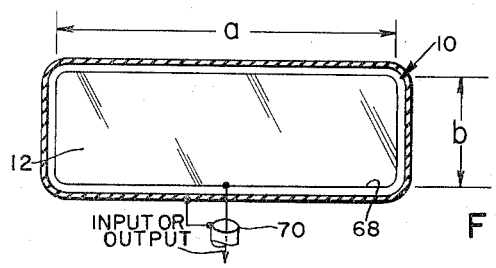
*INVENTOR.*
RALPH O. PARKER

United States Patent Office 3,210,766
Patented Oct. 5, 1965

3,210,766
SLOT TYPE ANTENNA WITH TUNING CIRCUIT
Ralph O. Parker, 6654 Will Rogers St.,
Los Angeles, Calif.
Filed Feb. 15, 1962, Ser. No. 173,523
6 Claims. (Cl. 343—743)

This invention relates to antennas employed for radio transmission and reception and, more particularly, to improvements therein.

In the past, attempts have been made to utilize conductive structures having other completely alien functions, such as radiators or receptors of electromagnetic waves. For example, a number of attempts have been made to employ part or all of automobile bodies as antennas. In general, antennas of this type have had several undesirable characteristics. First, they have had low efficiency, due to the difficulty in optimizing the coupling between the receiving and/or transmitting equipment. Secondly, the usually low impedance and devious current paths which conceivably exist in automobile body structures are troublesome. Furthermore, a lack of "omnidirectionality" is normally exhibited by a vehicle body functioning in an antenna system. Also, a high-ambient-noise level is encountered in the vicinity of an automobile body, due to the vehicles' electrical system as well as other features thereof. Finally, due to the physical size of the average automoible body structures, efficient antenna design or construction is limited to frequencies above those where the automobile body structures are an appreciable part of the wavelength.

An object of this invention is to provide an improved radio receiving or transmitting antenna which uses an active resonant component part of an existing appropriate metallic structure and/or dielectric structure of appropriate dimensions which has utility for purposes other than an antenna.

A further object of this invention is the provision of an arrangement whereby capacitive or inductive loading of existing nonresonant structures is achieved to effectuate resonating and coupling functions, with these structures in a unique manner.

Yet another object of this invention is the provision of an arrangement whereby an existing structure may be utilized as an antenna with a radiation or a reception pattern which is more omnidirectional than heretofore attainable with these general types of structures.

Still another object of the present invention is the provision of an arrangement for utilizing existing or new structures as an antenna which has a higher efficiency for comparable physical size than heretofore attainable at certain operating frequencies.

These and other objects of this invention may be achieved by using as an antenna an opening or a discontinuity in a conductive plane. This may more specifically be called a frame which is conductive and which may have glass or plastic or some other dielectric material filling the center space defined by the frame. The dimension of the frame may be selected for best reception at a desired frequency. A tuning network may be connected across the shorter dimension of the frame for enabling coupling thereto and for resonating the frame at a desired frequency.

The novel features that are considered characteristic of this invention are set forth with particularlity in the appended claims. The invention itself, both as to its organization and method of operation, as well as additional objects and advantages thereof, will best be understood from the following description when read in connection with the accompanying drawings, in which:

FIGURE 1 is a drawing of an embodiment of the invention including one type of resonating and coupling structure;

FIGURE 2 is a drawing of an embodiment of the invention including another manner of connecting thereto;

FIGURES 3 and 4 illustrate embodiments of the invention with different types of resonating networks for tuning and coupling;

FIGURE 5 is an embodiment of the invention which employs coaxial cable for resonating and tuning;

FIGURES 6, 7, and 8 are embodiments of the invention showing different types of filter networks being employed for resonating and tuning the antenna;

FIGURE 9 is another embodiment of the invention showing how a coaxial cable may be employed in conjunction therewith for effectuating tuning of the antenna;

FIGURE 10 shows how several of the inventive structures may be aligned for the purpose of obtaining a desired pattern or a desired gain; and FIGURE 11 shows how the embodiment of the invention may be mounted on a moving vehicle.

It has been found that currents flow about the perimeter of an appropriate discontinuity in a conductvie mass, such as a window opening in a car body. In accordance with the present invention, by means of tuning elements, various modes of radiation may be established in the structural discontinuity, such as the TE1,0 mode, similar to that existing in a section of waveguide, the TE2,0 mode, also similar to that existing in a section of waveguide, other higher order TE, or transverse electric, field modes, and the TEM (transverse electric magnetic) mode, similar to that utilized in ordinary coaxial cables and circular diffraction-type radiators.

Reference is now made to FIGURE 1, which is a drawing showing an arrangement of the invention by means of which a metallic discontinuity may be employed as an antenna. The word "frame" is applied to the metallic discontinuity 10, since, effectively, it defines or frames the inner space 12, which may be filled with a thin plane of low-loss dielectric material, such as glass or plastic. The configuration of the frame is such that the length $a$, in general, is greater than twice the width $b$. A tunable capacitor 14 has one side thereof connected to a location 15 at the inside of the frame 10, substantially in the center of the longest dimension. The other side of the capacitor 14 is connected to the inner conductor 16 of a coaxial cable 18. The ground shield 20 of the coaxial cable is connected at a location 21 on the inside of the frame, substantially opposite to the location 15, to which the other side of the capacitor is connected.

The tunable capacitor 14 resonates the structure by capacitive loading at the structure center to the TE1,0, TE2,0, TE3,0, or higher waveguide-type modes, and at the same time providing low-impedance output or input coupling to the coaxial line 18. Where the inner space is filled with a thin plane of low-loss dielectric material, the resonant frequency is modified by the expression $f_1 = f_0/\sqrt{\epsilon}$, where $f_0$ equals the air or vacuum-filled-space resonant frequency, $f_1$ equals the resonant frequency with the dielectric material added, and $\epsilon$ equals the dielectric constant of the filling material. The thickness of the frame structure surrounding the central aperture is not critical and may be an infinite plane or a layer of metal a few thousandths of an inch thick without appreciably affecting operation.

FIGURE 2 is a modification of FIGURE 1, in which another form of coupling to the coaxial cable is utilized. Similar reference numerals are employed for identifying similar-functioning structures to those shown in FIGURE 1. In this embodiment of the invention, the inductance of the conductor between the frame point 15 and point 16 is used in conjunction with variable capacitor 14, to affect an L-type matching and resonating circuit for the structure. The capacitor 14 is connected across the center of the longest dimension of the frame 10; the coaxial cable 18 has its inner conductor 16 connected to one side of the capacitor and its outer conductor connected to the other side of the capacitor 14 at the connection to the frame. The leads connecting the coaxial cable to the variable capacitor 14, therefore, will be of unequal length. Input or output to the antenna is effected through coaxial cable 18. The same radiation or reception modes are possible with this embodiment of the invention as are described in connection with FIGURE 1.

FIGURE 3 is a drawing of a modified form of FIGURE 1, in which another arrangement for resonating the antenna is utilized with coupling to a coaxial cable. As before, the same reference numerals are employed for similar-functioning structure. The variable inductor 22 has one end connected to the center of the longest dimension of the frame 10. The slider 24, or variable lead of the variable inductance 22, is connected to the center conductor of the coaxial cable 18 and also to one side of the variable capacitor 14. The other side of the variable capacitor 14 is connected to the other side of the frame opposite to the location at which the variable inductor is connected. The other side of the variable capacitor 14 is also connected to the ground shield of the coaxial cable 18. The variable inductor 22 inductively loads the structure to the point at which it can be resonated with the capacitor 14 at a desired L-to-C ratio. The same type of radiation or reception modes are made possible here as are described for the arrangement shown in FIGURE 1 of the drawing.

FIGURE 4 is a drawing of a modified arrangement of FIGURE 1, wherein the structure is made self-resonant at a frequency higher than the desired operating frequency in the desired mode. The variable capacitor 26 is connected across the frame 10, substantially at the center thereof. A second variable capacitor 28 is connected to one corner of the frame 10 through a curved lead 30. The other terminal of the capacitor 28 is connected to the inner conductor of a coaxial cable 32. The ground shield of the cable 32 is connected to the other corner of the frame 10 on the same side as the corner to which the curved lead 30 is connected.

The variable capacitor 26 capacitively loads and resonates the structure to the desired frequency and L-to-C ratio. The curved lead 30 provides a low-impedance loop that is inductively coupled to the resonated structure. Variable capacitor 28 provides a means of cancelling out the inductive reactance of the loop at the particular frequency being used, thus providing a resistive match to coaxial cable 32, which accordingly is resistively coupled to the antenna.

FIGURE 5 is a modification of FIGURE 1, in which the structure is made self-resonant at a frequency higher than the desired operating frequency in the desired mode. The variable capacitor 34 is connected across the frame 10 at the center of the longest dimension. A coaxial cable 36 has its inner conductor connected to the same connection points as the capacitor 34. The length $l_1$ of the coaxial cable 36 is made equal to one-half wavelength $\gamma$, at the operating frequency desired; however, this is reduced by the velocity constant of the particular cable being used. For example, type RG58/U has a velocity constant of 0.66. Another input and/or output coaxial cable 38 has its inner conductor connected to one of the junctions of the inner conductor of the cable 36 and the variable capacitor 34 in the frame 10. The ground shields of the coaxial conductors 36 and 38 are connected together by a lead 40, at the end of which these coaxial conductors connect to the frame.

Variable capacitor 34 resonates the structure to the desired operating frequency and L-to-C ratio. Coaxial cable 38 may be an extension of coaxial cable 36. Depending on the impedance of coaxial cables 36 and 38, any other set of points 42, 44 may be employed for connection than the ones shown to effect a closer impedance match. The shields of the cables 36 and 38 are left floating with respect to the frame.

FIGURE 6 is a drawing of another modified form of FIGURE 1, in which an inductor 46 is connected across the frame and a coaxial cable 48 has its inner conductor 50 and shield 52 connected to the inductance to bridge a center turn, or turns, such that a proper impedance match is provided for the following input or output circuit and resonance in one of the TE modes described previously is effected. The inductor 46 may be connected to the frame at the center of the structure or at any other set of points to effect proper impedance matching and resonance. Since the basic structure operating in the TE modes described is essentially a balanced one, as opposed to an unbalanced one, somewhat better impedance matching has been obtained, using balanced connections to the structure in the second, or TE2,0 mode, except for the structure shown in FIGURE 4 in which an unbalanced coupled circuit is used to effect good matching.

FIGURE 7 is a modified arrangement of FIGURE 1, in which a $\pi$LC network is formed by variable capacitors 54, 56 and inductance 58 for resonating and coupling the structure to the coaxial cable 60, which is used for input or output to the structure. The capacitor 54 is connected substantially at the center of the frame 10. The inductance 58 is connected to one side of the capacitor 54; the other side of the inductance 58 is coupled by capacitor 56 to the same side of the frame as that to which capacitor 54 is connected. The center conductor of the coaxial cable 60 is connected to the junction of inductance 58 and capacitor 56, and the ground shield of the cable 60 is connected to the same side of the frame as that to which capacitors 54 and 56 are coupled.

FIGURE 8 is another modification of a coupling structure used with the frame 10. This includes two serially connected variable capacitors, respectively, 62, 64, which are connected across the center of the longest dimension of the frame 10. The coaxial cable 66 has its center conductor connected to the junction of the capacitors 62, 64 and its ground shield connected to the same side of the frame 10 as either one of the capacitors 62, 64. These capacitors are used for resonating and coupling the antenna structure to the coaxial cable 66, which is used for input or output to the structure.

FIGURE 9 shows another arrangement of an embodiment of the invention. Here the dimensions of the frame 10 are not critical as long as they are smaller than 0.1 wavelength with respect to the operating frequency. The frame surrounds, but does not touch, a conductor 68, which forms a completed turn. This completed turn is attached to the inner conductor of the cable 70. The shield of the cable 70 is connected to the frame 10, substantially at the center of the longest dimensions of these conductors.

Here a TEM mode is utilized, which is similar to that in a circular diffraction mode, in which the frame 10 is an extension of the shield of the cable 70 and the single-turn conductor is an extension of the inner conductor of the cable. This results in an omnidirectional horizontal pattern, in which the electric field is radial and uniform between the frame and the single-turn conductor structure. This embodiment of the invention may be used in the standard-broadcast band, for example, using the front window of a vehicle. In this case, the glass of the window may be employed to form the supporting structure for the conductor 68. The mode used here should not be confused with a loop mode, since the conductor 68 is small in length and inclosed radius, compared to the operating wavelength, and current is uniform throughout.

FIGURE 10 is a drawing illustrating how the basic structures which have been previously described, except for that shown in FIGURE 9, may be incorporated in a resonant array, using one or more of these basic structures. There is shown, for example, an antenna 72 and another antenna 76, having the basic structure of FIGURE 1, which include therebetwen an antenna 74, having the structure shown in FIGURE 4. The spacings c, d between these antennas may be adjusted in accordance with desired gain or pattern. The three antennas are coupled together mechanically by means of an upper structure member 78, which connects to the junction of the variable capacitors, respectively 80, 82, 84, with the upper part of the respective frames 86, 88, 90 and a lower structure member 92, which connects to the junction of the capacitors 80, 82, 84 with the respective frames 86, 88, 90. Coupling to the antenna is had through the cable 96. One advantage of this type of array is that adjustments of equivalent electrical length of the respective antennas may be made by design, such that fundamental resonance is obtained in the midrange of the tuning capacitors 80, 82, 84. Assuming that the center frame 88 is the driven element, then the antenna component structure 88 or 90 may be made slightly capacitive or inductive by adjustment of the capacitors, as required to effect a desired gain in pattern in either direction e or f.

Any of the structures described heretofore may be mounted in any convenient area. For example, in FIGURE 11 an antenna 100 is shown mounted on top of an automobile 102. The antenna is mounted along the center of the roof of the automobile, with its lengthwise dimension running in a line parallel with the lengthwise dimension of the roof. This particular spot on a conventional vehicle is most practical because of the least wind resistance. A maximum effective height is also obtained here, and no vehicle structures distort the radiation pattern. The dimensions of the antenna can be made such that the height of the antenna above the roof of the vehicle can range from six inches to one foot, thus permitting a car to enter all normal garages, gas stations, etc. In an embodiment of this invention which was built, which was mounted in the manner shown, pattern tests indicate that when the lengthwise dimension of the antenna is made on the order of a quarter wavelength and when capacitive loading is provided to obtain resonance in the TE1,0 mode, a perfectly circular, horizontal pattern results. This is particularly desirable for most mobile operations.

All of the antenna arrangements described herein may be used in any location, since all of the necessary factors permitting operation are included within. They have been found to be particularly noncritical in regard to proximity to nonresonant structures. Of most concern in regard to proximity are resonant structures which are in line with the voltage field, i.e., the field across the narrow dimension of the structure. Those familiar with waveguide-type modes and antenna techniques will appreciate that in the low-order tranverse-electric field (TE) modes, the electric field is across the narrow dimension b of the structure; thus vertical polarization is established when the narrow dimension of the basic structure is vertical, and horizontal polarization results when the narrow dimension is horizontal. The magnetic field is circular about the electric-field distribution.

There has accordingly been described and shown hereinabove a novel and useful antenna structure which effectively utilizes the discontinuity in a conductive body, and, by adding thereto tuning elements, converts this to an efficient antenna structure.

I claim:

1. An antenna comprising a substantially rectangular conductive frame, the long sides of said frame exceeding the length of twice the short sides of said frame, means for tuning said antenna including a variable capacitance, means for connecting said variable capacitance between the centers of the two long sides of said frame, a second variable capacitance, a conductive lead, means for connecting one side of said second variable capacitance to one end of said conductive lead, means for connecting the other end of said conductive lead to one corner of said frame, a coaxial cable having a center conductor and a ground shield, means for connecting said ground shield to an adjacent corner of said rectangular frame, and means for connecting said inner conductor to the other side of said second capacitor.

2. An antenna comprising a substantially rectangular conductive frame, the two long sides of said rectangular frame exceeding twice the length of the two short sides thereof, means for tuning said antenna including a variable capacitor, means for connecting said variable capacitor between the two long sides of said frame, a first coaxial conductor, a second coaxial conductor, said first and second coaxial conductors having a center conductor and a ground shield, means for connecting the opposite ends of said first coaxial conductor to the two connections of said variable capacitor to said frame, means for connecting the center conductor of said second coaxial cable to one of the connections of said variable capacitor to said frame, and means for connecting the shields of said first and second coaxial cables together in the region where connection is made by both said coaxial cables to said frame.

3. An antenna as recited in claim 2 where said first coaxial cable has a length which is substantially equal to one-half the wavelength at the desired operational frequency of said antenna.

4. An antenna comprising a substantially rectanguar conductive frame, the long sides of said frame being greater than twice the length of the short sides of said frame, means for tuning said antenna including an inductance, means directly connecting one side of said inductance to one of the long sides of said frame, means directly connecting the other side of said inductance to the other long side of said frame, a coaxial cable having a center conductor and a ground shield, and means for connecting the center conductor and said ground shield to said inductance at points which are spaced apart by at least one turn of said inductance.

4. An antenna comprising a substantially rectangular conductive frame, the long side of said frame exceeding in length twice the length of the short side of said frame, means for tuning said antenna including a variable filter connected across the long sides of said frame, a coaxial cable, and means for connecting said coaxial cable to said variable filter means and to said frame, said variable filter includes a first capacitor connected betwen the long sides of said rectangular frame, an inductance, one side of said inductance being connected to one side of said first variable capacitor, a second variable capacitor, said second variable capacitor being connected between the other side of said inductance and the side of said frame to which said first variable capacitor is connected, said coaxial cable having an inner conductor and a shield, means for connecting said inner conductor to the junction of said second variable capacitor and said inductance, and means for connecting said shield to said frame.

6. An antenna comprising a substantially rectangular conductive frame, the long side of said frame exceeding in length twice the length of the short side of said frame, means for tuning said antenna including a variable filter connected across the long sides of said frame, a coaxial cable, and means for connecting said coaxial cable to said variable filter means and to said frame, said tunable filter comprises a first and second variable capacitor, means connecting said first and second variable capacitors in series, means for connecting said series-connected variable capacitors between the two longer sides of said rectangular frame, said coaxial cable having a center conductor and a shield, means for connecting said shield to one of the longer sides of said frame, and means for connecting said center conductor between said two variable capacitors.

References Cited by the Examiner
UNITED STATES PATENTS

| | | | |
|---|---|---|---|
| 2,563,243 | 8/51 | Hills | 343—818 |
| 2,923,813 | 2/60 | Davis | 343—712 |
| 2,971,191 | 2/61 | Davis | 343—866 |
| 2,996,713 | 8/61 | Boyer | 343—745 |
| 3,066,293 | 11/62 | Davis | 343—712 |

ELI LIEBERMAN, *Acting Primary Examiner.*

HERMAN KARL SAALBACH, *Examiner.*